(12) United States Patent
Fornage

(10) Patent No.: US 7,817,450 B2
(45) Date of Patent: Oct. 19, 2010

(54) METHOD AND APPARATUS FOR RESETTING A SILICON CONTROLLED RECTIFIER BRIDGE

(75) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 12/383,499

(22) Filed: Mar. 25, 2009

(65) Prior Publication Data

US 2009/0244947 A1 Oct. 1, 2009

Related U.S. Application Data

(60) Provisional application No. 61/070,923, filed on Mar. 26, 2008.

(51) Int. Cl.
*H02H 7/122* (2006.01)

(52) U.S. Cl. ......................................... 363/58

(58) Field of Classification Search .................. 363/58; 307/127; 361/82, 84
See application file for complete search history.

(56) References Cited

U.S. PATENT DOCUMENTS

| | | | |
|---|---|---|---|
| 3,568,021 A | 3/1971 | Turnbull | |
| 3,583,378 A | 6/1971 | Pattee | |
| 3,694,730 A | 9/1972 | Hoft et al. | |
| 4,131,937 A | 12/1978 | Pelly et al. | |
| 4,172,278 A | 10/1979 | Leverich | |
| 4,204,268 A | 5/1980 | Vivirito | |
| 4,336,563 A | 6/1982 | Suzuki | |
| 4,488,101 A | 12/1984 | Studtmann | |
| 4,570,212 A | 2/1986 | Edwards et al. | |
| 4,633,241 A | 12/1986 | Casteel et al. | |
| 6,144,191 A | 11/2000 | Raedy | |
| 6,617,913 B1 * | 9/2003 | Johnson | 327/423 |
| 6,815,845 B1 * | 11/2004 | McCallum | 307/127 |
| 7,276,882 B2 * | 10/2007 | Minks et al. | 322/28 |
| 2004/0075963 A1 | 4/2004 | Liu et al. | |

FOREIGN PATENT DOCUMENTS

JP 54153233 A 12/1979

(Continued)

OTHER PUBLICATIONS

"Inverters, Converters, Controllers and Interconnection System Equipment for Use With Distributed Energy Resources," Underwriters Laboratories Inc., UL Standard 1741.1, May 7, 1999, downloaded from web site http://ulstandardsinfonet.ul.com/scopes/1741.html on Jun. 12, 2009.
"IEEE Standard for Interconnecting Distributed Resources with Electric Power Systems," IEEE Std 1547™-2003, IEEE, Jul. 28, 2003, Copyright 2003 by the Institute of Electrical and Electronics Engineers, Inc.

(Continued)

*Primary Examiner*—Adolf Berhane
*Assistant Examiner*—Emily Pham
(74) *Attorney, Agent, or Firm*—Moser IP Law Group

(57) ABSTRACT

A method and an apparatus for resetting at least one Silicon Controlled Rectifier (SCR) in an H-bridge. The apparatus comprises a current interruption device for controlling current flow through the H-bridge, and a negative voltage detector for detecting a negative voltage at the H-bridge and driving the current interruption device to control the current flow through the H-bridge.

30 Claims, 4 Drawing Sheets

FOREIGN PATENT DOCUMENTS

| | | | |
|---|---|---|---|
| JP | 56132163 | A | 10/1981 |
| JP | 57-151273 | A | 9/1982 |
| JP | 57-151274 | A | 9/1982 |
| JP | 63208317 | A | 8/1988 |

OTHER PUBLICATIONS

International Search Report and Written Opinion mailed Nov. 10, 2009 for Application No. PCT/US2009/038271.

\* cited by examiner

METHOD AND APPARATUS FOR RESETTING A SILICON CONTROLLED RECTIFIER BRIDGE

CROSS-REFERENCE TO RELATED APPLICATIONS

This application claims benefit of U.S. provisional patent application Ser. No. 61/070,923, filed Mar. 26, 2008, which is herein incorporated in its entirety by reference.

BACKGROUND OF THE INVENTION

1. Field of the Invention

Embodiments of the present disclosure generally relate to a method and apparatus for controlling Silicon Controlled Rectifiers (SCRs) in an H-bridge.

2. Description of the Related Art

A common topology for DC-AC inverters employs a DC-DC booster stage followed by an H-bridge. The H-bridge acts to create a true AC waveform at the inverter output by "unfurling" a rectified sine wave received from the DC-DC booster stage. In some instances, the AC output of the DC-AC inverter may be coupled to a commercial power grid, and the H-bridge operates at the frequency of the AC line voltage on the grid. For example, distributed generators (DGs), such as solar power systems, convert DC power generated by renewable resources to AC power that may be coupled to the grid.

Many DC-AC inverters employ Silicon Controlled Rectifiers (SCRs) as the H-bridge switching elements due to their robustness, easy control, and low cost. However, in systems where the inverter output is coupled to the grid, anomalies occurring in the AC line voltage may induce a commutation failure in such an H-bridge. For example, if the AC line voltage suddenly reverses polarity prior to its normal zero-crossing, the active SCRs in the H-bridge may erroneously remain in a conductive state ("on") during the next half of the AC line voltage cycle while the previously inactive SCRs are also switched on. This effectively "shorts" the H-bridge, resulting in an uncontrolled current surge through the inverter and subsequent damage to the inverter.

Therefore, there is a need for a method and apparatus for controlling Silicon Controlled Rectifiers (SCRs) in an H-bridge.

SUMMARY OF THE INVENTION

Embodiments of the present invention generally relate to a method and apparatus for resetting at least one Silicon Controlled Rectifier (SCR) in an H-bridge. The apparatus comprises a current interruption device for controlling current flow through the H-bridge, and a negative voltage detector for detecting a negative voltage at the H-bridge and driving the current interruption device to control the current flow through the H-bridge.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
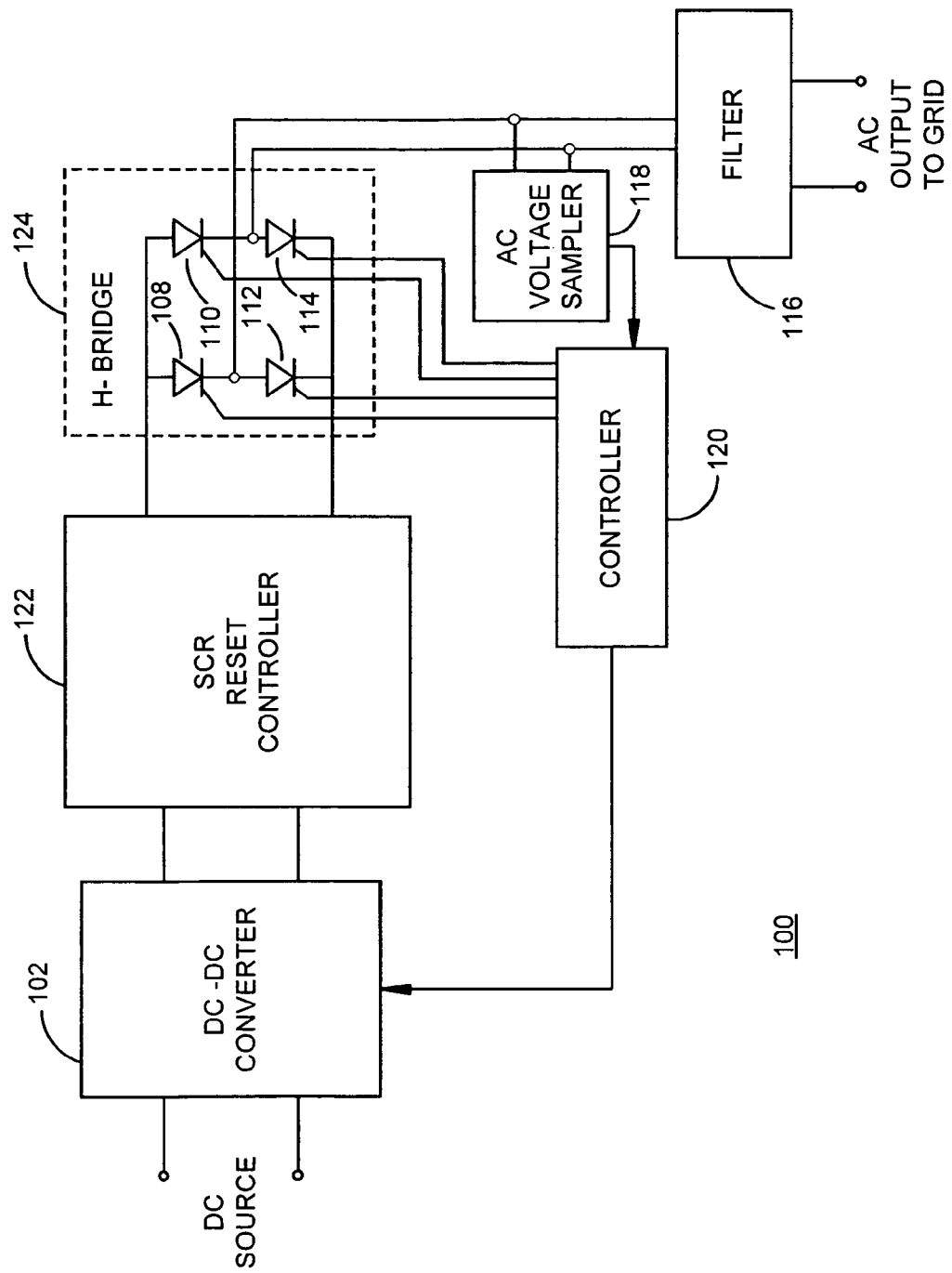
FIG. 1 is a block diagram of a power conversion module in accordance with one or more embodiments of the present invention.

FIG. 1 is a block diagram of a power conversion module 100 in accordance with one or more embodiments of the present invention. The power conversion module 100 accepts a DC input power from a DC source and converts such DC power to an AC output power. In some embodiments of the present invention, the power conversion module 100 may be employed in a distributed generator (DG), such as a solar power system, for converting DC power from photovoltaic (PV) modules to AC power that is coupled to an AC commercial power grid.

The power conversion module 100 comprises a DC-DC converter 102, a Silicon Controlled Rectifier (SCR) reset controller 122, an H-bridge 124, a controller 120, an AC voltage sampler 118, and a filter 116. In alternative embodiments, the DC-DC converter 102 may be excluded from the power conversion module 100. In other alternative embodiments, the DC-DC converter 102 may be external to the power conversion module 100 and coupled to the power conversion module 100. In such embodiments, a single DC-DC converter 102 may be coupled to a single power conversion module 100; alternatively, multiple DC-DC converters 102 may be coupled to a single power conversion module 100.

The DC-DC converter 102 is coupled to the controller 120, the SCR reset controller 122, and the H-bridge 124. The DC-DC converter 102 accepts a DC input voltage and converts the DC input voltage to a DC output voltage in accordance with DC-DC conversion control signals received from the controller 120. The DC output voltage from the DC-DC converter 102 is then coupled to the H-bridge 124 through the SCR reset controller 122. The H-bridge 124 is coupled to the controller 120 and converts the received DC voltage to an AC output voltage in accordance with DC-AC conversion control and switching signals received from the controller 120. Such AC output voltage is then coupled to the AC commercial power grid ("grid") via the filter 116, which acts to smooth the AC output voltage.

The H-bridge 124 comprises SCRs 108, 110, 112, and 114. SCRs 108 and 112 are coupled in series such that a cathode terminal of the SCR 108 is coupled to an anode terminal of the SCR 112. Similarly, SCRs 110 and 114 are coupled in series such that a cathode terminal of the SCR 110 is coupled to an anode terminal of the SCR 114. The series combinations of SCRs 108/112 and SCRs 110/114 are coupled across two output terminals of the SCR reset controller 122, and the SCR reset controller 122 is further coupled across two output terminals of the DC-DC converter 102.

The controller 120 is coupled to a control gate of each SCR 108, 110, 112, and 114 for activating (i.e., switching on) the SCRs. Additionally, the controller 120 is coupled to the DC-DC converter 102 and to the AC voltage sampler 118 for obtaining DC current and voltage samples and AC line voltage samples, respectively. The controller 120 utilizes such samples to produce the control and switching signals for driving the DC-DC converter 102 and the H-bridge 124 to generate an AC power output that is optimally achieved from the DC power input to the power conversion module 100; i.e., the AC power output is synchronously coupled to the grid.

In one or more embodiments of the present invention, the DC output voltage from the DC-DC converter 102 has the form of a full-wave rectified sine wave, where the frequency of the rectified sine wave is twice the frequency of the AC line voltage on the grid. During normal operation, each SCR diagonal of the H-bridge 124 (i.e., SCRs 108/114 and SCRs 110/112) conducts current for half of the AC line voltage cycle. At each AC line voltage zero-crossing, the active SCR diagonal deactivates (i.e., switches off) as the DC voltage across the H-bridge 124, and hence the current through the active SCR diagonal, drops to zero, and remains reverse-biased (i.e., inactive) during the subsequent half of the AC line voltage cycle. Additionally, the controller 120 drives the previously inactive SCR diagonal to activate (i.e., switch on). Thus, the SCR diagonals sequentially operate in a mutually exclusive fashion, where each pair is on or off during the opposite line voltage half-cycle from the other pair. Such operation "unfurls" the full-wave rectified sine wave input to the H-bridge 124 to generate a true AC waveform output that is in phase with the line voltage.

In accordance with one or more embodiments of the present invention, the SCR reset controller 122 detects a negative voltage condition capable of causing one or more of the SCRs in the H-bridge 124 to operate improperly. Such a negative voltage may be caused by a commutation failure or an abnormality in the AC waveform on the grid. Upon detecting the negative voltage, the SCR reset controller 122 interrupts current flow through the H-bridge 124, thereby immediately resetting the improperly conducting SCRs and averting any damage to the power conversion module 100. The SCR reset controller 122 maintains the current interruption for a period of time (i.e., a stabilization period) in order to positively allow the abnormality to clear before operation of the power conversion module 100 resumes.

Figure 2:
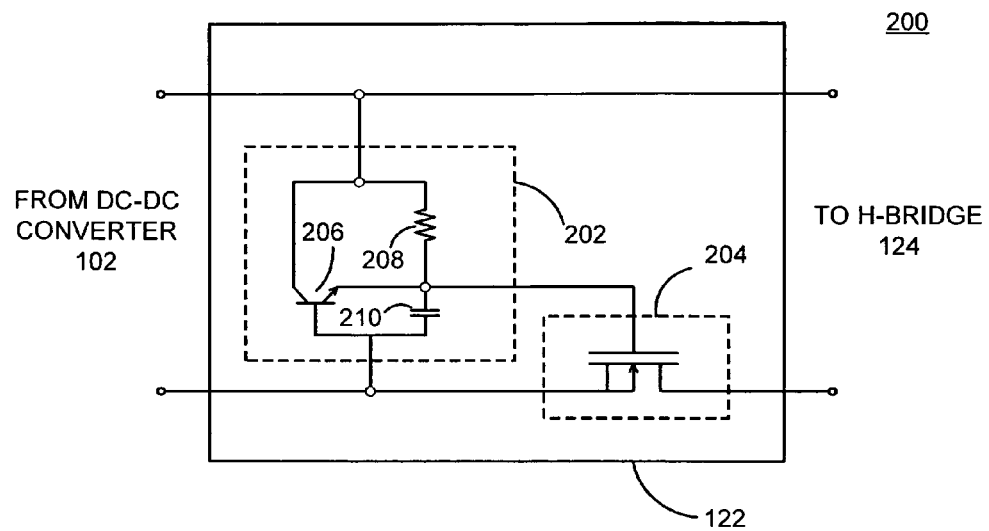
FIG. 2 is a schematic diagram of an SCR reset controller in accordance with one or more embodiments of the present invention

FIG. 2 is a schematic diagram of an SCR reset controller 122 in accordance with one or more embodiments of the present invention. The SCR reset controller 122 comprises a negative voltage detector 202 coupled to a current interruption device 204.

The negative voltage detector 202 comprises a transistor 206, a resistor 208, and a capacitor 210. In some embodiments of the present invention, the transistor 206 is an npn Bipolar Junction Transistor (BJT); alternatively, other types of transistors may be utilized to perform the same function, and the transistor selection is considered a design choice. The resistor 208 is coupled across the emitter-collector junction of the transistor 206, and the capacitor 210 is coupled across the emitter-base junction of the transistor 206. Additionally, the collector-base junction of the transistor 206 is coupled across two output terminals of the DC-DC converter 102.

The current interruption device 204 is coupled across the emitter-base junction of the transistor 206 and controls the flow of current through the power conversion module 100, and hence through the H-bridge 124. In some embodiments, the current interruption device 204 is an n-channel depletion-mode metal-oxide-semiconductor field-effect transistor (MOSFET), i.e., a switch 204, where a gate terminal of the switch 204 is coupled to the emitter terminal of the transistor 206, and a source terminal of the switch 204 is coupled to the base terminal of the transistor 206.

During normal operation (i.e., no commutation failures or anomalies on the grid), the DC-DC converter 102 generates a positive voltage across the negative voltage detector 202, i.e., across the collector-base junction of the transistor 206, driving the transistor 206 to operate in a cut-off mode ("off"). In some embodiments, the positive voltage across the negative voltage detector 202 may be a large voltage on the order of 400V, requiring the transistor 206 to be a high voltage/medium current transistor.

The resistor 208 drops such a large voltage to a lower voltage, for example on the order of 12V, and the capacitor 210 maintains this lower voltage at the gate terminal of the switch 204. Additionally, the base-emitter junction of the transistor 206 emulates a zener diode, for example a 12V zener diode, in order to limit the gate voltage at the switch 204. Such a gate voltage maintains the switch 204 in an active mode (i.e., "on"), allowing current to flow through the power conversion module 100 and hence through the H-bridge 124.

In the event of an anomaly causing a negative voltage across the negative voltage detector 202, sufficient current flows through the base-collector junction of the transistor 206 to saturate (i.e., switch on) the transistor 206, discharging the capacitor 210 and "shorting out" the gate voltage of the switch 204 to deactivate the switch 204. As a result, current can no longer flow through the power conversion module 100, thereby interrupting current flow through the H-bridge 124 and allowing the active SCRs to reset.

Upon interrupting the current flow, the voltage across the negative voltage detector 202 again becomes positive, causing the transistor 206 to switch off. The capacitor 210 begins to recharge through the resistor 208 as determined by the RC time constant of the resistor 208/capacitor 210 (i.e., a stabilization period). Such a stabilization period allows sufficient time for the anomaly to fully clear before resuming normal operation and prevents any oscillation between on/off states of the transistor 206 while the anomaly clears.

Upon recharging, the capacitor 210 applies sufficient voltage at the gate terminal of the switch 204 to activate the switch 204, allowing current to flow through the conversion module 100 and normal operation to resume. In some embodiments, the resistor 208 and capacitor 210 are selected such that the stabilization period is on the order of 50 microseconds, e.g., a typical duration of a grid anomaly.

Figure 3:
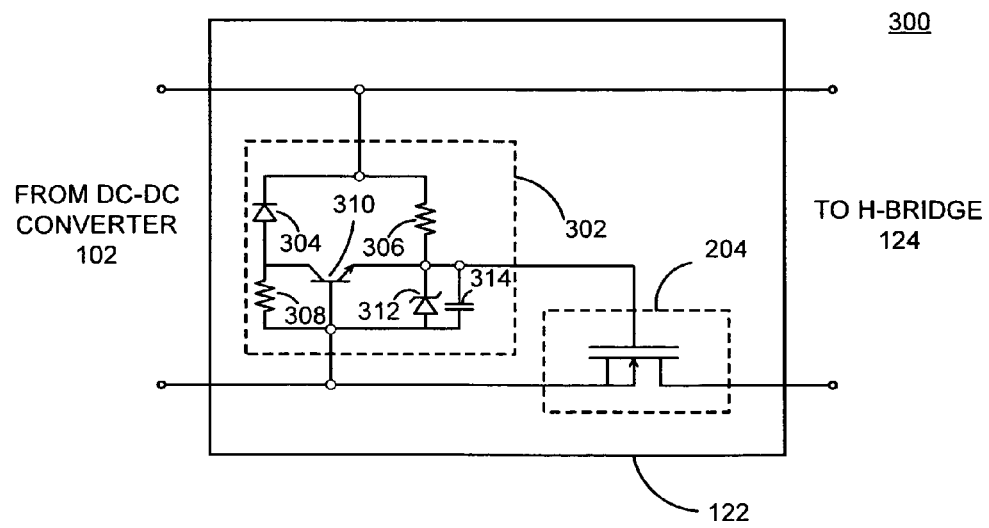
FIG. 3 is a schematic diagram of an SCR reset controller in accordance with one or more alternative embodiments of the present invention.

FIG. 3 is a schematic diagram of an SCR reset controller 122 in accordance with one or more alternative embodiments of the present invention. The SCR reset controller 122 comprises a negative voltage detector 302 coupled to a current interruption device 204 (i.e., a switch 204).

The negative voltage detector 302 comprises a diode 304, resistors 306 and 308, a transistor 310, a zener diode 312, and a capacitor 314. The resistor 308 is coupled across the emitter-base junction of the transistor 310. Further, the zener diode 312 and the capacitor 314 are coupled across the collector-base junction of the transistor 310, where the anode terminal of the zener diode 312 is coupled to the base terminal of the transistor 310.

The resistor 306 is coupled to the collector terminal of the transistor 310 and to the cathode terminal of the diode 304, and the anode terminal of the diode 304 is coupled to the emitter terminal of the transistor 310. The gate terminal of the switch 204 is coupled to the collector terminal of the transistor 310 and the source terminal of the switch 204 is coupled to the base terminal of the transistor 310. The cathode terminal of the diode 304 and the anode terminal of the zener diode 312 are coupled across two output terminals of the DC-DC converter 102.

During normal operation (i.e., no commutation failures or anomalies on the grid), the DC-DC converter 102 generates a positive voltage across the negative voltage detector 302, driving the transistor 310 to operate in a cut-off mode ("off"). The diode 304 is reverse biased and prohibits current flow through the corresponding leg of the negative voltage detector 302, and resistor 306 drops the voltage across the negative voltage detector 302 to a lower voltage, for example on the order of 12V. The capacitor 314 maintains this lower voltage at the gate terminal of the switch 204; additionally, the zener diode 312 is reverse biased and ensures that the gate voltage at the switch 204 is limited to the zener voltage (e.g., on the order of 12V). Such a gate voltage drives the switch 204 in an active mode (i.e., "on"), allowing current to flow through the power conversion module 100 and hence through the H-bridge 124.

In the event of an anomaly causing a negative voltage across the negative voltage detector 302, the diode 304 becomes forward biased and current flows through the resistor 308 and the diode 304. Sufficient current is drawn from the base to the emitter terminal of the transistor 310 to activate the transistor 310, discharging the capacitor 314 and "shorting out" the gate voltage of the switch 204 to deactivate the switch 204. As a result, current can no longer flow through the power conversion module 100, thereby interrupting current flow through the H-bridge 124 and allowing the active SCRs to reset.

Upon interrupting the current flow, the voltage across the negative voltage detector 302 again becomes positive, reverse biasing the diode 304 and causing the transistor 310 to switch off. The capacitor 314 begins to recharge through the resistor 306 as determined by the RC time constant of the resistor 306/capacitor 314 (i.e., a stabilization period). Such a stabilization period allows sufficient time for the anomaly to fully clear before resuming normal operation and prevents any oscillation between on/off states of the transistor 310 while the anomaly clears.

Upon recharging, the capacitor 314 applies sufficient voltage at the gate terminal of the switch 204 to activate the switch 204, allowing current to flow through the conversion module 100 and normal operation to resume. In some embodiments, the resistor 306 and capacitor 314 are selected such that the stabilization period is on the order of 50 microseconds, e.g., a typical duration of a grid anomaly.

Figure 4:
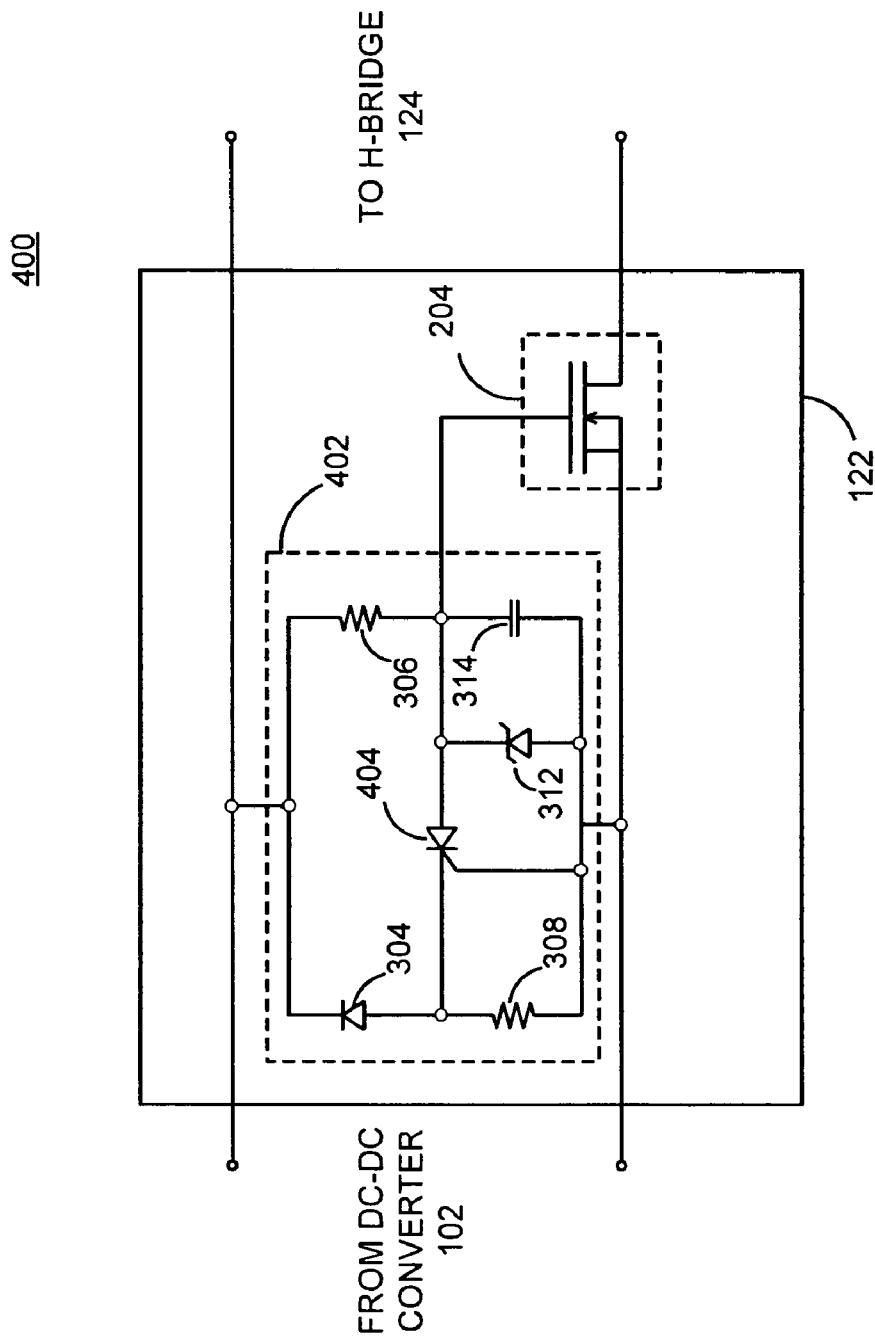
FIG. 4 is a schematic diagram of an SCR reset controller in accordance with one or more alternative embodiments of the present invention.

FIG. 4 is a schematic diagram of an SCR reset controller 122 in accordance with one or more alternative embodiments of the present invention. The SCR reset controller 122 comprises a negative voltage detector 402 coupled to a current interruption device 204 (i.e., a switch 204). The negative voltage detector 402 comprises a diode 304, resistors 306 and 308, a zener diode 312, and a capacitor 314, arranged as in FIG. 3, and an SCR 404 replacing the transistor 310. An anode terminal of the SCR 404 is coupled to the cathode terminal of the zener diode 312, a gate terminal of the SCR 404 is coupled to the anode terminal of the zener diode 312, and a cathode terminal of the SCR 404 is coupled to the anode terminal of the diode 304.

During normal operation (i.e., no commutation failures or anomalies on the grid), the DC-DC converter 102 generates a positive voltage across the negative voltage detector 402 and the SCR 404 operates in a "deactivated" mode (i.e., the SCR 404 is "off"). The diode 304 is reverse biased and prohibits current flow through the corresponding leg of the negative voltage detector 402, and resistor 306 drops the voltage across the negative voltage detector 402 such that an appropriate voltage is provided at the switch 204 to maintain the switch 204 in an active mode (i.e., "on"), as previously described with respect to FIG. 3.

In the event of an anomaly causing a negative voltage across the negative voltage detector 402, the diode 304 becomes forward biased and current flows through the resistor 308 and the diode 304. Additionally, sufficient voltage is applied at the gate of the SCR 404 to activate the SCR 404, fully discharging the capacitor 314 and "shorting out" the gate voltage of the switch 204 to deactivate the switch 204. As a result, current can no longer flow through the power conversion module 100, thereby interrupting current flow through the H-bridge 124 and allowing the active SCRs to reset.

Upon interrupting the current flow, the voltage across the negative voltage detector 402 again becomes positive, reverse biasing the diode 304 and blocking current flow through the SCR 404, thereby causing the SCR 404 to turn off. The capacitor 314 begins to recharge through the resistor 306, providing a stabilization period determined by the RC time constant of the resistor 306/capacitor 314 as previously described.

Upon recharging, the capacitor 314 applies sufficient voltage at the gate terminal of the switch 204 to again activate the switch 204 to allow current to flow through the conversion module 100 and normal operation to resume.

Figure 5:
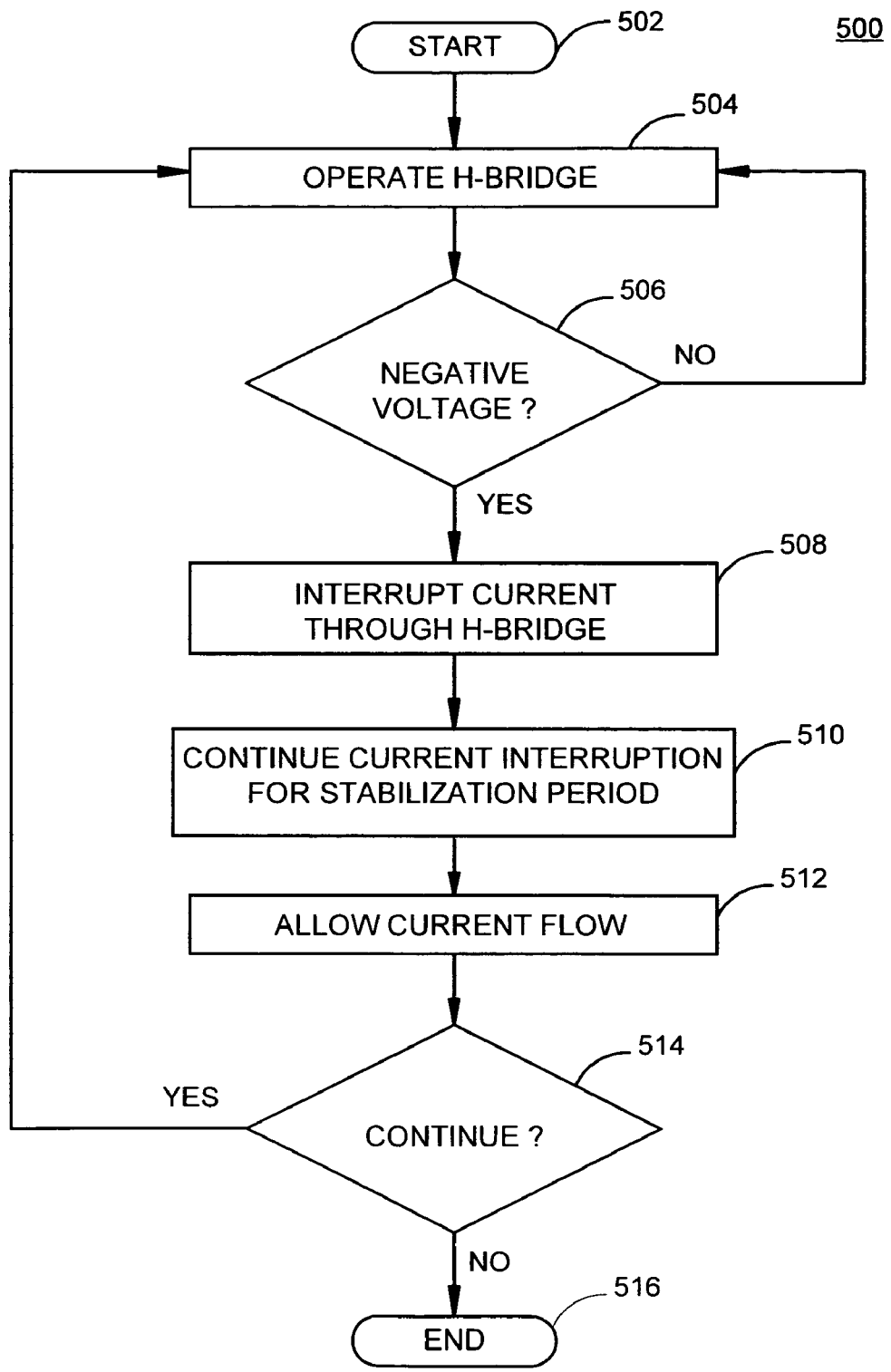
FIG. 5 is a flow diagram of a method for resetting SCRs in an H-bridge in accordance with one or more embodiments of the present invention.

FIG. 5 is a flow diagram of a method 500 for resetting SCRs in an H-bridge in accordance with one or more embodiments of the present invention. In some embodiments, such as the embodiment described below, an H-bridge comprising SCRs as the switching elements is utilized to convert a DC input voltage to an AC output voltage, where the AC output voltage is coupled to an AC line. An SCR reset controller is coupled to the H-bridge for detecting a negative voltage across the H-bridge and, upon detecting the negative voltage, causing the SCRs within the H-bridge to reset.

The method 500 starts at step 502 and proceeds to step 504, where the DC input voltage is applied to the H-bridge and the H-bridge converts the DC input voltage to the AC output voltage based on control and switching signals from a controller. The control and switching signals drive the H-bridge such that the generated AC output voltage is synchronized with an AC line voltage of the AC line. In some embodiments, the H-bridge may reside within a power conversion module, such as DC/AC inverter, and the AC output voltage may be coupled to an AC commercial power grid.

The method 500 proceeds to step 506. At step 506, a determination is made whether a negative voltage across the H-bridge is detected. Such a negative voltage may be generated by a commutation failure or an anomaly in the AC line voltage. If a negative voltage is not detected across the H-bridge, the method 500 returns to step 504; if a negative voltage is detected across the H-bridge, the method 500 proceeds to step 508.

At step 508, current flow through the H-bridge is interrupted. In some embodiments, the current flow may be interrupted by generating a voltage to deactivate (i.e., switch off) a switch, such as a MOSFET switch, at an input terminal of the H-bridge. As a result of interrupting the current flow, the conducting SCRs in the H-bridge, i.e., the SCRs conducting at the time the negative voltage is detected, cease conducting and reset. The method 500 proceeds to step 510.

At step 510, the method 500 waits an appropriate amount of time to allow the fault causing the negative voltage to positively clear (i.e., a stabilization period). Such a stabilization period may be determined by an RC time constant of the SCR reset controller. During the stabilization period, current flow through the H-bridge remains interrupted, for example by maintaining the switch at the input terminal of the H-bridge in an off state. In some embodiments, the stabilization period is on the order of 50 microseconds, e.g., a typical duration of a grid anomaly. The method 500 then proceeds to step 512.

At step 512, current flow through the SCR bridge is allowed to resume, for example by generating a voltage to activate the switch at the input terminal of the SCR bridge. At step 514, a determination is made whether to continue operating the H-bridge. If the result of such determination is yes, the method 500 returns to step 504; if the result of such determination is no, the method 500 proceeds to step 516 where it ends.

While the foregoing is directed to embodiments of the present invention, other and further embodiments of the invention may be devised without departing from the basic scope thereof, and the scope thereof is determined by the claims that follow.

The invention claimed is:

1. Apparatus for resetting at least one Silicon Controlled Rectifier (SCR) in an H-bridge, comprising:
   a current interruption device for controlling current flow through the H-bridge; and
   a negative voltage detector for detecting a negative voltage at the H-bridge and driving the current interruption device to control the current flow through the H-bridge, wherein the negative voltage detector comprises a transistor, a resistor, and a capacitor, wherein (i) the resistor is coupled across an emitter-collector junction of the transistor, (ii) the capacitor is coupled across an emitter-base junction of the transistor, and (iii) a collector-base junction of the transistor is coupled across the H-bridge.

2. The apparatus of claim 1, wherein the negative voltage detector causes the current interruption device to interrupt the current flow for a stabilization period in response to the detecting and to allow the current flow following the stabilization period.

3. The apparatus of claim 2, wherein the negative voltage detector generates a first voltage and a second voltage, wherein the first voltage causes the current interruption device to interrupt the current flow through the H-bridge and the second voltage causes the current interruption device to allow the current flow through the H-bridge.

4. The apparatus of claim 2, wherein the stabilization period is determined by an RC time constant of the negative voltage detector.

5. The apparatus of claim 1, wherein the current interruption device is a semiconductor switch.

6. Apparatus for resetting at least one Silicon Controlled Rectifier (SCR) in an H-bridge, comprising:
   a current interruption device for controlling current flow through the H-bridge; and
   a negative voltage detector for detecting a negative voltage at the H-bridge and driving the current interruption device to control the current flow through the H-bridge, wherein the negative voltage detector, comprises a diode, a first resistor, a second resistor, a transistor, a zener diode, and a capacitor, wherein (i) the first resistor is coupled across an emitter-base junction of the transistor, (ii) the zener diode is coupled across a collector-base junction of the transistor, an anode terminal of the zener diode coupled to a base terminal of the transistor, (iii) the capacitor is coupled across the collector-base junction, (iv) a first terminal of the second resistor is coupled to a collector terminal of the transistor and a second terminal of the second resistor is coupled to a cathode terminal of the diode, (v) an anode terminal of the diode is coupled to an emitter terminal of the transistor, and (vi) the cathode terminal of the diode and the base terminal of the transistor are coupled across the H-bridge.

7. Apparatus for resetting at least one Silicon Controlled Rectifier (SCR) in an H-bridge, comprising:
   a current interruption device for controlling current flow through the H-bridge; and
   a negative voltage detector for detecting a negative voltage at the H-bridge and driving the current interruption device to control the current flow through the H-bridge, wherein the negative voltage detector comprises a diode, a first resistor, a second resistor, a silicon controlled rectifier (SCR), a zener diode, and a capacitor, wherein (i) the first resistor is coupled between a cathode terminal and a gate terminal of the SCR, (ii) the zener diode is coupled between an anode terminal and the gate terminal of the SCR, an anode terminal of the zener diode coupled to the gate terminal of the SCR, (iii) the capacitor is coupled between the anode terminal and the gate terminal of the SCR, (iv) a first terminal of the second resistor is coupled to the anode terminal of the SCR and a second terminal of the second resistor is coupled to a cathode terminal of the diode, (v) an anode terminal of the diode is coupled to the cathode terminal of the SCR, and (vi) the cathode terminal of the diode and the gate terminal of the SCR are coupled across the H-bridge.

8. An inverter, comprising:
   an H-bridge comprising at least one Silicon Controlled Rectifier (SCR);
   a current interruption device for controlling current flow through the H-bridge; and
   a negative voltage detector for detecting a negative voltage at the H-bridge and driving the current interruption device to control the current flow through the H-bridge, wherein the negative voltage detector comprises a transistor, a resistor, and a capacitor, wherein (i) the resistor is coupled across an emitter-collector junction of the transistor, (ii) the capacitor is coupled across an emitter-base junction of the transistor, and (iii) a collector-base junction of the transistor is coupled across the H-bridge.

9. The inverter of claim 8, wherein the negative voltage detector causes the current interruption device to interrupt the current flow for a stabilization period in response to the detecting and to allow the current flow following the stabilization period.

10. The inverter of claim 9, wherein the negative voltage detector generates a first voltage and a second voltage, wherein the first voltage causes the current interruption device to interrupt the current flow through the H-bridge and the second voltage causes the current interruption device to allow the current flow through the H-bridge.

11. The inverter of claim 9, wherein the stabilization period is determined by an RC time constant of the negative voltage detector.

12. The inverter of claim 8, wherein the current interruption device is a semiconductor switch.

13. An inverter, comprising:
   an H-bridge comprising at least one Silicon Controlled Rectifier (SCR);
   a current interruption device for controlling current flow through the H-bridge; and
   a negative voltage detector for detecting a negative voltage at the H-bridge and driving the current interruption device to control the current flow through the H-bridge, wherein the negative voltage detector comprises a diode, a first resistor, a second resistor, a transistor, a zener diode, and a capacitor, wherein (i) the first resistor is coupled across an emitter-base junction of the transistor, (ii) the zener diode is coupled across a collector-base junction of the transistor, an anode terminal of the zener diode coupled to a base terminal of the transistor, (iii) the capacitor is coupled across the collector-base junction, (iv) a first terminal of the second resistor is coupled to a collector terminal of the transistor and a second terminal of the second resistor is coupled to a cathode terminal of the diode, (v) an anode terminal of the diode is coupled to an emitter terminal of the transistor, and (vi) the cathode terminal of the diode and the base terminal of the transistor are coupled across the H-bridge.

14. An inverter, comprising:
an H-bridge comprising at least one Silicon Controlled Rectifier (SCR);
a current interruption device for controlling current flow through the H-bridge; and
a negative voltage detector for detecting a negative voltage at the H-bridge and driving the current interruption device to control the current flow through the H-bridge, wherein the negative voltage detector comprises a diode, a first resistor, a second resistor, a silicon controlled rectifier (SCR), a zener diode, and a capacitor, wherein (i) the first resistor is coupled between a cathode terminal and a gate terminal of the SCR, (ii) the zener diode is coupled between an anode terminal and the gate terminal of the SCR, an anode terminal of the zener diode coupled to the gate terminal of the SCR, (iii) the capacitor is coupled between the anode terminal and the gate terminal of the SCR, (iv) a first terminal of the second resistor is coupled to the anode terminal of the SCR and a second terminal of the second resistor is coupled to a cathode terminal of the diode, (v) an anode terminal of the diode is coupled to the cathode terminal of the SCR, and (vi) the cathode terminal of the diode and the gate terminal of the SCR are coupled across the H-bridge.

15. The apparatus of claim 6, wherein the negative voltage detector causes the current interruption device to interrupt the current flow for a stabilization period in response to the detecting and to allow the current flow following the stabilization period.

16. The apparatus of claim 15, wherein the negative voltage detector generates a first voltage and a second voltage, wherein the first voltage causes the current interruption device to interrupt the current flow through the H-bridge and the second voltage causes the current interruption device to allow the current flow through the H-bridge.

17. The apparatus of claim 15, wherein the stabilization period is determined by an RC time constant of the negative voltage detector.

18. The apparatus of claim 6, wherein the current interruption device is a semiconductor switch.

19. The apparatus of claim 7, wherein the negative voltage detector causes the current interruption device to interrupt the current flow for a stabilization period in response to the detecting and to allow the current flow following the stabilization period.

20. The apparatus of claim 19, wherein the negative voltage detector generates a first voltage and a second voltage, wherein the first voltage causes the current interruption device to interrupt the current flow through the H-bridge and the second voltage causes the current interruption device to allow the current flow through the H-bridge.

21. The apparatus of claim 19, wherein the stabilization period is determined by an RC time constant of the negative voltage detector.

22. The apparatus of claim 7, wherein the current interruption device is a semiconductor switch.

23. The inverter of claim 13, wherein the negative voltage detector causes the current interruption device to interrupt the current flow for a stabilization period in response to the detecting and to allow the current flow following the stabilization period.

24. The inverter of claim 23, wherein the negative voltage detector generates a first voltage and a second voltage, wherein the first voltage causes the current interruption device to interrupt the current flow through the H-bridge and the second voltage causes the current interruption device to allow the current flow through the H-bridge.

25. The inverter of claim 23, wherein the stabilization period is determined by an RC time constant of the negative voltage detector.

26. The inverter of claim 13, wherein the current interruption device is a semiconductor switch.

27. The inverter of claim 14, wherein the negative voltage detector causes the current interruption device to interrupt the current flow for a stabilization period in response to the detecting and to allow the current flow following the stabilization period.

28. The inverter of claim 27, wherein the negative voltage detector generates a first voltage and a second voltage, wherein the first voltage causes the current interruption device to interrupt the current flow through the H-bridge and the second voltage causes the current interruption device to allow the current flow through the H-bridge.

29. The inverter of claim 27, wherein the stabilization period is determined by an RC time constant of the negative voltage detector.

30. The inverter of claim 14, wherein the current interruption device is a semiconductor switch.

* * * * *